Oct. 11, 1960     J. K. McDUFFEE     2,955,385
METHOD OF MAKING GLASS-TO-METAL SEALS
Filed Nov. 9, 1956

OXIDE LAYER

INVENTOR
J. K. McDUFFEE
BY
ATTORNEY

United States Patent Office 2,955,385
Patented Oct. 11, 1960

2,955,385

METHOD OF MAKING GLASS-TO-METAL SEALS

John K. McDuffee, Kutztown, Pa., assignor to Western Electric Company, Incorporated, New York, N.Y., a corporation of New York Filed Nov. 9, 1956, Ser. No. 621,329

3 Claims. (Cl. 49—81)

This invention relates to composite glass and metal members which are fused together and particularly to a method of making improved glass-to-metal seals therefor.

The art of forming seals or junctions between glass and metal members has developed to a point where it is now possible to mass-produce vacuum-tight seals which also have high mechanical strength. Probably the best seals of this type are realized by fusing glass to a uniform oxide coating on a cobalt-nickel-iron alloy known in the trade as Kovar. While molten glass does not readily wet or adhere to the bare metal, it has a strong affinity for the oxide coating and adheres tenaciously when fused thereto. When such conventional seals are used in composite glass and metal members such as the composite housings of certain types of vacuum tubes, it has been found that in spite of the high initial quality of the seals, large percentages of them fail and do not meet minimum standards after they have been subjected to cleaning operations which may be necessary in the subsequent processing of the devices. Microscopic examination of such weakened glass-to-metal seals in vacuum tube housings disclosed that the seals had been eroded and undermined, probably due to dissolution of the seals in the acid cleaning solutions, the seals being rich in metallic oxides which are soluble in the acids.

It is, therefore, an object of this invention to produce seals between such composite glass and metal members which are resistant to such cleaning solutions and yet have the strength realized with the use of an oxide-type bond.

In a preferred method of forming such seals, the glass is placed in contact with a pre-oxidized surface of the metal and the assemblage is then heated in an oxide-protecting atmosphere to a temperature sufficient to plasticize and commence fusing the glass to the oxidized surface. The seal is then subjected to a reducing atmosphere for a time sufficient to reduce substantially all the oxide at the exposed edges of the seal after which the seal is allowed to cool. In this way the glass is formed around and seals the edges of the oxide, thereby making the enclosed oxide-rich seal substantially impervious to attack by acids or other reducing agents.

Figure 1:
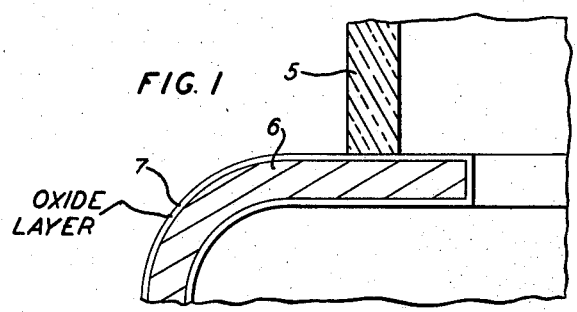
Figure 2:
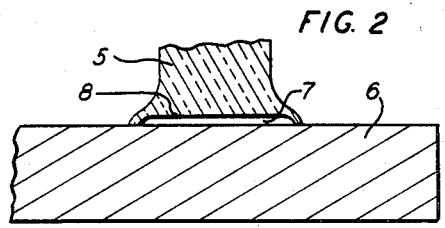

These and other features of the invention will be more fully understood from the following detailed description taken in conjunction with the accompanying drawing, in which:

Fig. 1 is a cross-section elevational view of a portion of a composite metal and glass vacuum tube housing preparatory to fusing; and Fig. 2 is an enlarged cross-sectional view of the composite member after fusing the improved acid-resistant seal.

In Fig. 1, a cross-sectional view of portions of a glass member 5 and a cobalt-nickel-iron alloy member 6 having an oxide layer or coating 7 are shown in assembled position preparatory to fusing. The thickness of the oxide coating 7 is exaggerated in both figures of the drawing for purposes of illustration. In practice this oxide coating may be less than one-half a thousandth of an inch thick. The parts 5 and 6 may be, for example, the glass ring and a concentrically aligned bell-shaped Kovar alloy housing member, respectively, such as are used in the electronic discharge device disclosed in Patent 2,527,127 to R. S. Gormley, C. Maggs, and L. F. Moose. The Kovar alloy is well-known in the trade and comprises substantially the following proportions:

| | Percent |
|---|---|
| Cobalt | 18 |
| Nickel | 30 |
| Iron | 52 |

The glass is preferably a hard boro-silicate glass having a melting point of about 900 to 1000° centigrade. While the proportions of the metals in the alloy and the constituents in the glass are not believed to be critical, it is necessary that they have substantially identical coefficients of expansion to prevent fracture in the glass for wide temperature variations to which the composite member may be subjected.

After fusing the assemblage of Fig. 1 to fabricate the composite glass and metal member as seen in Fig. 2, the glass member 5 of Fig. 1 is bonded to the oxide coating 7 on the metal member 6, a portion of the oxide being absorbed and diffused into the glass as indicated by the darkened area 8 of the seal. The oxide is substantially uniform over the main area of the seal, except for the edges which are feathered out and surrounded by the glass so that the glass portion substantially encloses the seal engaging the surface of the metal portion 6 to provide a barrier or protective wall for the metallic oxide portion 7 of the seal. Tests performed on composite members of this type which are cleaned with conventional acidic solutions were found to be almost impervious to attack thereby and were substantially as strong after cleaning as conventional seals were before cleaning.

In forming the composite member shown in Fig. 2, the assemblage of Fig. 1 is positioned on a suitable fixture and heated in an oxide-protecting atmosphere which may be neutral or slightly oxidizing (i.e., pure or slightly wet nitrogen) in order to keep the oxide layer uniform until the glass wets and starts to seal thereto. As the glass becomes plastic it starts to flow forming the fillets and seals to the oxide layer 7. The seal is then subjected to a reducing atmosphere, i.e., by adding hydrogen to the oxide-protecting atmoshpere, to reduce the exposed oxide both on the metal and combined in the glass near the edge of the fillets so that when the seal is finally made, as seen in Fig. 2, the oxide in the edges of the seal is substantially reduced to pure metal. The flow of the glass is arrested when the oxide surrounding the seal has been reduced and the glass contacts the clean metal alloy, since glass does not readily wet to the clean metal. The assemblage is finally cooled to permit the seal to solidify. The percentage of hydrogen added to the neutral or slightly oxidizing atmosphere to make it reducing is not critical; however, it is recommended that the hydrogen content be kept below 10 percent, since amounts in excess of this may prove dangerous.

It is to be understood that the above described arrangements are simply illustrative of the application of the principles of the invention. Numerous other arrangements for fabricating devices other than vacuum tubes may be readily devised by those skilled in the art which will embody the principles of the invention and fall within the spirit and scope thereof.

What is claimed is:

1. The method of forming a seal between glass and the surface of a cobalt-nickel-iron alloy having an oxide coating thereon which comprises the steps of placing the glass in contact with the oxide coating, heating the assemblage in an oxide-protecting atmosphere to a temperature sufficient to plasticize and fuse the glass to the oxide coating, subjecting the edges of the seal area to a reducing atmosphere while the glass is at the plasticizing temperature for a time sufficient to cause the glass to flow at the edges of the seal area into contact with the clean alloy to increase the resistance of the seal to acid attack by enclosing completely the oxide coating within the seal area between the glass and the alloy, and then allowing the seal to cool.

2. The method of forming a seal between glass and the surface of a cobalt-nickel-iron alloy which has a uniform oxide coating thereon which comprises the steps of placing the glass in contact with the oxide coating, heating the assemblage in a neutral atmosphere to a temperature sufficient to plasticize and fuse the glass to the oxide, changing the atmosphere while the glass is at the plasticizing temperature to a reducing one for a time sufficient to reduce the oxide at the edges of the seal area and to cause the glass to flow at the edges of the seal area into contact with the clean alloy to increase the resistance of the seal to attack from reducing agents by enclosing completely the oxide coating within the seal area between the glass and the alloy, and finally allowing the seal to cool.

3. The method of forming a seal between a borosilicate glass and the surface of a cobalt-nickel-iron alloy which has a uniform oxide coating thereon which comprises the steps of placing the glass in contact with the oxide coating, heating the assemblage in an oxidizing atmosphere to a temperature sufficient to plasticize and fuse the glass to the oxide, changing the atmosphere to a reducing one for a time sufficient to reduce the oxide at the edges of the seal area and to cause the glass to flow at the edges of the seal area into contact with the clean alloy to increase the resistance of the seal to acidic attack by enclosing completely the oxide coating within the seal area between the glass and the alloy, and finally allowing the seal to cool.

References Cited in the file of this patent
UNITED STATES PATENTS

| | | |
|---|---|---|
| 1,692,998 | Ruben | Nov. 27, 1928 |
| 2,010,145 | Eitel | Aug. 6, 1935 |
| 2,279,168 | Kalischer et al. | Apr. 7, 1942 |
| 2,446,277 | Gordon | Aug. 3, 1948 |
| 2,450,130 | Gordon et al. | Sept. 28, 1948 |
| 2,670,572 | Smith | Mar. 2, 1954 |

OTHER REFERENCES

Ser. No. 209,150, Karl (A.P.C.), published Apr. 27, 1943.